(12) United States Patent
Nakai et al.

(10) Patent No.: US 8,218,108 B2
(45) Date of Patent: Jul. 10, 2012

(54) LIQUID CRYSTAL DISPLAY PANEL AND LIQUID CRYSTAL DISPLAY DEVICE

(75) Inventors: Nobuhiko Nakai, Tsu (JP); Kouji Kusuda, Kameyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 293 days.

(21) Appl. No.: 12/376,358

(22) PCT Filed: Sep. 10, 2007

(86) PCT No.: PCT/JP2007/067606
§ 371 (c)(1),
(2), (4) Date: Jul. 21, 2010

(87) PCT Pub. No.: WO2008/038511
PCT Pub. Date: Apr. 3, 2008

(65) Prior Publication Data
US 2010/0296028 A1    Nov. 25, 2010

(30) Foreign Application Priority Data

Sep. 28, 2006 (JP) .................................. 2006-265093

(51) Int. Cl.
*G02F 1/1335* (2006.01)
(52) U.S. Cl. ............................ 349/96; 349/97; 349/106
(58) Field of Classification Search .................. None
See application file for complete search history.

(56) References Cited

U.S. PATENT DOCUMENTS

| | | | |
|---|---|---|---|
| 5,467,208 A | 11/1995 | Kokawa et al. | |
| 5,596,429 A | 1/1997 | Kokawa et al. | |
| 5,973,450 A | 10/1999 | Nishizawa et al. | |
| 6,261,479 B1 | 7/2001 | Yukinobu et al. | |
| 7,180,567 B2 * | 2/2007 | Ikeda et al. | 349/155 |
| 8,054,419 B2 * | 11/2011 | Liu et al. | 349/106 |
| 2003/0007112 A1 * | 1/2003 | Matsushita et al. | 349/106 |
| 2004/0090582 A1 * | 5/2004 | Ikeda et al. | 349/130 |
| 2005/0128381 A1 | 6/2005 | Tanose et al. | |

(Continued)

FOREIGN PATENT DOCUMENTS

AU         39893/93        12/1993

(Continued)

OTHER PUBLICATIONS

International Search Report for PCT/JP2007/067606 mailed Oct. 30, 2007.

*Primary Examiner* — Tina Wong
(74) *Attorney, Agent, or Firm* — Nixon & Vanderhye P.C.

(57) ABSTRACT

The present invention provides a liquid crystal display device excellent in display qualities, capable of suppressing coloring of stains such as a fingerprint which has adhered to a surface of a display so that the stains are not recognized. The present invention is a liquid crystal display panel having a structure in which the first polarizer, the first substrate, a liquid crystal layer, the second substrate, and the second polarizer are stacked in this order toward a display surface, wherein the second polarizer includes an anti-reflective film on a display surface side, a reflection spectrum of the anti-reflective film having a bottom wavelength of less than 550 nm, at least one of the first and second substrates includes a color filter including three colors of blue, green, and red, and in the color filter, blue has the highest depolarization property of all the three colors.

7 Claims, 5 Drawing Sheets

U.S. PATENT DOCUMENTS

| | | | |
|---|---|---|---|
| 2006/0087603 A1* | 4/2006 | Lee | 349/109 |
| 2006/0103799 A1* | 5/2006 | Ikeda et al. | 349/124 |

FOREIGN PATENT DOCUMENTS

| | | |
|---|---|---|
| EP | 0 573 268 | 12/1993 |
| EP | 0 827 180 | 3/1998 |
| EP | 0 911 859 | 4/1999 |
| JP | 7-005452 | 1/1995 |
| JP | 9-096805 | 4/1997 |
| JP | 10-069866 | 3/1998 |
| JP | 11-204065 | 7/1999 |
| JP | 11-228872 | 8/1999 |
| JP | 2001-194658 | 7/2001 |
| JP | 2001-290024 | 10/2001 |
| JP | 2002-082207 | 3/2002 |
| JP | 2005-173078 | 6/2005 |
| JP | 2006-003453 | 1/2006 |

* cited by examiner

LIQUID CRYSTAL DISPLAY PANEL AND LIQUID CRYSTAL DISPLAY DEVICE

This application is the U.S. national phase of International Application No. PCT/JP2007/067606 filed 10 Sep. 2007 which designated the U.S. and claims priority to Japanese Patent Application No. 2006-265093 filed 28 Sep. 2006, the entire contents of each of which are hereby incorporated by reference.

TECHNICAL FIELD

The present invention relates to a liquid crystal display panel and a liquid crystal display device. More specifically, the present invention relates to a liquid crystal display panel which includes a polarizer having an anti-reflective film for preventing reflection of external light. The present invention also relates to a liquid crystal display device including such a liquid crystal display panel.

BACKGROUND ART

The liquid crystal display panel is a display panel which controls alignment of a birefringent liquid crystal molecule to control transmission/shielding (ON/OFF in display) of light. The liquid crystal display panel generally includes a color filter for color display and a polarizer which transmits only a specific polarization component of incident light. According to such a liquid crystal display panel, it is commonly known that an anti-reflective film for reducing a reflectance by light interference is arranged on a surface of a display (display screen) as means for preventing reflection of external light. FIG. 8 is a cross-sectional view showing an arrangement configuration of an anti-reflective film which reduces a reflectance by light interference. As shown in FIG. 8, such a type of an anti-reflective film 23 is arranged on an observation side surface of a base material 22 arranged on a display 21. The configuration of this type of the anti-reflective film is designed in such a way that incident light 24 is divided into two reflected lights 24a and 24b, and a phase of the reflected light 24a that has been reflected on the outermost surface of the anti-reflective film 23 is different from a phase of the reflected light 24b that has been reflected on the boundary surface between the anti-reflective film 23 and the base material 22 just by N-½ (N is an integer of 1 or more). Accordingly, the phase of the reflected light 24a is opposite to the phase of the reflected light 24b. Therefore, the phases cancel each other by interference. Using this, the reflectance can be reduced.

Conditions for reducing a reflectance of the anti-reflective film depend on a wavelength of light to be reflected. FIG. 9 is a graph showing a reflection spectrum of a common anti-reflective film. As shown in FIG. 9, the reflection spectrum of the common anti-reflective film is shown by a U shape having the bottom at a specific wavelength. In FIG. 9, the reflection spectrum is an integrating sphere reflectance measured using a spectrophotometer (product of Hitachi High-Technologies Corporation, trade name: U-4100).

As shown in FIG. 9, it is difficult for the conventional anti-reflective film to reduce the reflectance uniformly in the entire wavelength region. Under such a circumstance, in view of neutral color (achromatic color) in chromaticity of reflected light and luminous reflectance (Y value), an anti-reflective film which is designed in such a way that the bottom wavelength of the reflectance is 550 to 600 nm is known. Herein, the luminous reflectance means tristimulus values Y obtained from a reflection spectrum of light reflected by the anti-reflective film, a spectrum of light outputted from a standard light source, and color matching functions corresponding to sensitivity of a human eye.

If the display surface is touched by a bare hand and thereby a fingerprint adheres to the anti-reflective film, for example, the optical design is changed at the part where the fingerprint has adhered. As a result, the part where the fingerprint has adhered is tinted. Even if the fingerprint is wiped off, the fingerprint is not completely removed and the sebum tends to remain, generally. In such a case, the remained sebum is tinted to shin. In this point, the anti-reflective film has room for improvement in order to prevent a reduction in display qualities even in the case that stains such as a fingerprint adheres to the surface of the anti-reflective film.

For this problem, it is disclosed that an anti-reflective film surface is coated with a hydrophobic anti-stain film, thereby preventing stains such as a fingerprint and a water stain from adhering to the anti-reflective film surface. Further, it is disclosed that an anti-reflective film is subjected to multi-coating of thin films to have some different bottom wavelengths in a visible light region, thereby preventing reflected light from being tinted (for example, refer to Patent Document 1). However, a method capable of more easily preventing the reduction in display qualities, caused by stains such as a fingerprint, has been desired.

With regard to the wavelength where the reflectance of light reflected through the anti-reflective film is minimum, it has been known that, in a projection type display device, an anti-reflective film whose bottom wavelength has been adjusted is arranged on a surface of a polarizer, in order to prevent return light from an output side from entering a TFT (thin film transistor) liquid crystal panel, thereby preventing a reduction in image qualities due to an increase in leakage current, or alternatively in order to suppress an increase in reflectance of red at any incident angle of a light beam in CRT (a cathode-ray tube) display (for example, refer to Patent Documents 2 and 3). However, Patent Documents 2 and 3 neither disclose nor suggest a method of preventing the reduction in display qualities when stains such as a fingerprint adhere to the anti-reflective film.

[Patent Document 1]
  Japanese Kokai Publication No. Hei-07-5452
[Patent Document 2]
  Japanese Kokai Publication No. Hei-09-96805
[Patent Document 3]
  Japanese Kokai Publication No. Hei-11-204065

DISCLOSURE OF INVENTION

The present invention has been made in view of the above-mentioned state of the art. The present invention has an object to provide a liquid crystal display panel and a liquid crystal display device each of which has excellent display qualities because coloring of stains such as a fingerprint which has adhered to a surface of a display are suppressed so that the stains are not recognized.

The present inventors made various investigations on an anti-reflective film which is provided for a polarizer in order to prevent reflection of external light. The inventors noted that if a fingerprint adheres to a surface of the anti-reflective film, the fingerprint shines in blue at the time of black display under bright environment, which results in deterioration of display qualities. Then, the inventors found that the reason why the part where the fingerprint has adhered is recognized as a tinted part as follows. In the case that a fingerprint adheres to the surface of the anti-reflective film, a refractive index of the anti-reflective film increases. Therefore, the bottom wavelength of the reflection spectrum is shifted to the long-wavelength region and the reflectance in the short-wavelength region is increased. Further, in the case that the fingerprint adheres to the surface of the anti-reflective film, a length of an optical path is substantially extended. Further, the inventors found that if an anti-reflective film whose reflection spectrum has a bottom wavelength of less than 550 nm is used, the increase in reflectance in the short-wavelength region, due to the fingerprint adherence to the anti-reflective film, can be reduced, and as a result, it is possible to suppress the fingerprint from shining in blue.

The inventors made further studies on the anti-reflective film, and found that if an anti-reflective film whose reflection spectrum has a bottom wavelength of less than 550 nm is used, a color tone of displayed light is shifted to yellow (red) when black is displayed under bright environment. Further, the inventors found that a depolarization property of the color filter is adjusted in such a way that blue has the highest depolarization property, thereby the color of the displayed light, which has been shifted to yellow, can be adjusted to be an almost achromatic color (color of light from a light source). As a result, the above-mentioned problems have been admirably solved, leading to completion of the present invention.

That is, the present invention relates to a liquid crystal display panel having a structure in which a first polarizer, a first substrate, a liquid crystal layer, a second substrate, and a second polarizer are stacked in this order toward a display surface, wherein the second polarizer includes an anti-reflective film on a display surface side, a reflection spectrum of the anti-reflective film having a bottom wavelength of less than 550 nm, at least one of the first and second substrates includes a color filter including three colors of blue, green, and red, and in the color filter, blue has the highest depolarization property of all the three colors.

The present invention is mentioned below in more detail.

The liquid crystal display panel of the present invention has a structure in which the first polarizer, the first substrate, the liquid crystal layer, the second substrate, and the second polarizer are stacked in this order toward the display surface. That is, according to the liquid crystal display panel of the present invention, a pair of substrates are arranged to include a liquid crystal layer therebetween. Further, a pair of polarizers is arranged with the pair of substrates therebetween. An anti-reflective film is arranged on a display surface side of the second polarizer. Of the pair of substrates, the second polarizer is positioned on the display surface side. At least one of the pair of substrates includes a color filter. The configuration of the liquid crystal display panel of the present invention may or may not include other components as long as it essentially includes such components. For example, an alignment film may be arranged on the liquid crystal layer side of each of the first and second substrates and a retarder may be arranged on the first substrate side of the first polarizer and on the second substrate side of the second polarizer.

The anti-reflective film used in the present invention reduces reflected light by light interference. That is, according to the anti-reflective film of the present invention, light reflected on the second polarizer surface and light reflected on the anti-reflective film surface cancel each other by interference, whereby reducing the reflectance. Specifically, with regard to light at a wavelength $\lambda$, satisfying the following formula (1), where n is a refractive index of the anti-reflective film; d is a thickness of the anti-reflective film; and N is an integer of 1 or more, a difference in phase between light reflected on the second polarizer surface and light reflected on the anti-reflective film surface is an odd multiple of ½ wavelength. Hence, these lights cancel each other by interference, in principle.

$$n \times 2d = (N - \tfrac{1}{2})\lambda \tag{1}$$

The reflection spectrum of the anti-reflective film has a bottom wavelength of less than 550 nm. In the present description, "the bottom wavelength of the reflection spectrum" means a wavelength where the reflection spectrum of the anti-reflective film shows the minimum reflectance if the anti-reflective film which is positioned on the polarizer is measured for the reflection spectrum. The bottom wavelength satisfies the above formula (1). The reflection spectrum may be measured under the following conditions, for example. With regard to a light source, a heavy hydrogen lamp is used to radiate UV light, and a 50 W halogen lamp is used to radiate visible/infrared lights; and a $\Phi60$ nm integrating sphere whose inner surface is coated with $BaSO_4$ is irradiated with reflected light at an incident angle of 10°; and a base material which shows a reflectance not depending on a wavelength is used as the base material; a measurement wavelength range is 380 to 780 nm (visible light region). If a base material which shows a reflectance depending on a wavelength is used, a reflectance attributed to the wavelength dependence of the base material is calculated and subtracted. In the case that the reflection spectrum has a bottom wavelength of less than 550 nm, a change in reflection spectrum in a blue wavelength region can be made smaller, even if adherence of stains such as a fingerprint changes the reflection spectrum.

The above-mentioned anti-reflective film is arranged on the display panel surface to which stains easily adhere. However, the bottom wavelength of the reflection spectrum is less than 550 nm, and therefore, light reflected on a surface where stains have adhered or a surface where stains have been wiped off but not completely removed, can be recognized as an almost achromatic color. Therefore, the stains can be less observed to practically have no influence on the visibility. Thus, the reduction in display qualities can be suppressed.

The stains whose influences on the display qualities are suppressed by the above-mentioned anti-reflective film of the present invention include a fingerprint that is a residue of sebum, sweat, and the like, and grease. The display qualities are adversely influenced by not only the stains which have adhered to the film surface but also those which have adhered to the film surface and then have been wiped off to be spread. In the present invention, it is possible to effectively prevent at least the stains which have adhered to the film surface and then have been wiped off to be spread from adversely influencing the display qualities.

A transparent material is preferably used for the above-mentioned anti-reflective film. For example, an organic material such as fluorine resin, and an inorganic material such as silicon dioxide ($SiO_2$), indium tin oxide (ITO) may be used. The embodiment of the anti-reflective film is not especially limited. The anti-reflective film may consist of a single layer or a plurality of layers. As the anti-reflective film, an AR (Anti-Reflection) film, an LR (Low Reflection) film, and the like, can be used. The AR film is formed by a dry process, such as deposition and sputtering. The AR film has a multilayer structure including about four to seven layers. The LR film consists of a single layer or a few layers. The LR film shows a reflectance higher than that of the AR film, but the LR film has a high productivity and costs on it are low. Therefore, such an LR film is preferably used in a display which is used indoors where influences by external light are small. According to any of these embodiments, it is possible to suppress stains such as a fingerprint which has adhered to the surface from shining in blue if the bottom wavelength of the reflection spectrum is less than 550 nm.

At least one of the first and second substrates includes a color filter including three colors of blue, green, and red, and in the color filter, blue has the highest depolarization property of all the three colors. The above-mentioned anti-reflective film can suppress stains such as a fingerprint from shining in blue at the time of black display under bright environment, but simultaneously, the color tone on the entire display surface tends to be shifted to yellow (red). When liquid crystal display is observed under bright environment, a spectrum of light which is perceived by human eyes includes a spectrum of light which has been reflected on the uppermost surface of the display surface and a spectrum of light which has been outputted through the panel. Especially in a low-color tone region around the region where black is displayed, influences of the reflected light are relatively large. In the present invention, a yellowish (reddish) light is suppressed from being displayed by adjusting a chromaticity of leakage light at the time of black display by controlling a depolarization property of the color filter. Herein, the term "depolarization property" means a property of depolarizing light. A pigment contained in the color filter has this property. If the depolarization property of the color filter is adjusted in such a way that blue has the highest depolarization property, blue light most highly leaks from the polarizer by a scattering function of the color filter. Thus, the yellowish (reddish) light can be adjusted to be an almost achromatic color. In this case, with regard to a contrast ratio of light which has passed through the liquid crystal display panel, red has the largest contrast ratio among the three colors of red, green, and blue. Such a depolarization property of the color filter is attributed to a light scattering property of a pigment contained in the color filter. The depolarization property of the color filter depends on a thickness of the color filter, a shape or size of the pigment particle, and the like. A polarizer which has almost 100% of a polarization degree is used in the liquid crystal display panel. Therefore, even a slight shift of the scattering changes the display qualities. Accordingly, the light scattering is adjusted, for example, by using a more fine pigment particle, and thereby the depolarization property of the color filter can be adjusted. In the present description, blue means a color having a dominant wavelength of 380 to 480 nm; green means a color having a dominant wavelength of 480 to 570 nm; and red means a color having a dominant wavelength of 570 to 780 nm. Accordingly, cyan, magenta, yellow, and the like are also classified into any of blue, green, and red. In the present invention, colored layers of four or more colors may be arranged. In this case, the colored layers of two or more colors are recognized as the same color.

With regard to balance between the depolarization properties in the color filter included in the liquid crystal display panel of the present invention, it is preferable that blue has a depolarization property higher than that of red. It is more preferable that green whose wavelength region is between that of blue and that of red has a depolarization property higher than that of red but smaller than that of blue. That is, it is more preferable that the depolarization property is high in order of blue>green>red. Thus, it is preferable that in the color filter, blue, green, and red are ranked in descending order of depolarization property. If blue, green, and red are ranked in descending order of depolarization property, an amount of light which leaks from the polarizer due to the scattering function of the color filter is large in order of blue>green>red. Therefore, the yellowish (reddish) light can be adjusted to be displayed as an almost achromatic color.

According to the present embodiment, blue has the highest depolarization property and further red has the lowest depolarization property. Therefore, the display light can be more effectively suppressed from becoming yellowish (reddish) light. In this case, the contrast ratio of light which has passed through the liquid crystal display panel is large in order of red>green>blue. It is preferable that a difference in contrast ratio among blue, green, and red is large enough to compensate the reflection spectrum of light reflected on the anti-reflective film (LR film or AR film) surface. As a preferable difference in a rate of the contrast ratio among blue (470 nm), green (550 nm), and red (610 nm), for example, a difference between opposite values in a reflected light intensity rate among them is mentioned.

It is preferable that the first polarizer and the second polarizer are disposed in Cross-Nicol arrangement, and a transmission spectrum of the first and second polarizers is flat in a visible light region. In the present description, "a transmission spectrum of the first and second polarizers is flat in a visible light region" means that a difference between the maximum transmittance and the minimum transmittance of light which has passed through the first and second polarizers is 0.03% or less in a wavelength of 400 to 650 nm. According to a conventional transmission spectrum of polarizers disposed in Cross-Nicol arrangement, the difference between the maximum transmittance and the minimum transmittance is about 0.08% in a wavelength of 400 to 650 nm. Therefore, the change in the display color at the time of black display under bright environment also depends on a profile of a Cross-Nicol spectrum of the polarizers. According to the present Embodiment, the spectrum of light which has passed through the first and second polarizers is flat, which causes no coloring of display light. Therefore, a design of the anti-reflective film and adjustment of the depolarization property of the color filter can be easily performed. According to the present Embodiment, the polarization axes of the first and second polarizers are not necessarily arranged to be perpendicular to each other (Cross-Nicol), and may be arranged to be parallel to each other (Parallel Nicol).

It is preferable that a reflection spectrum of the anti-reflective film has a bottom wavelength of more than 500 nm. A luminous reflectance of the anti-reflective film increases if the bottom wavelength of the reflection spectrum is less than 500 nm. As a result, external light might be highly reflected. If the bottom wavelength is more than 500 nm and less than 550 nm, both of the reflection of external light and stains can be less observed to practically have no influence on visibility. With regard to the bottom wavelength, the bottom wavelength is more preferably more than 510 nm and less than 540 nm, and still more preferably 530 nm. In the present description, "more than (larger than, higher than) X" or "less than (smaller than, lower than) X" does not include the value X. In addition, "X or more (or larger, or higher)" and "X or less (or smaller, or lower)" include the value X.

An embodiment in which a surface of the anti-reflective film is provided with a light scattering anti-glare (AG) treatment may be mentioned as a preferable embodiment of the anti-reflective film of the present invention. The AG treatment means a treatment for providing the film with a structure for scattering external light. For example, a treatment for forming irregularities on the anti-reflective film surface may be mentioned. Not just using the anti-reflective film of the present invention, the light scattering anti-glare treatment is additionally adopted, and thereby the effect of preventing reflection of external light can be more improved.

It is preferable that the anti-reflective film is arranged on an outermost surface of the liquid crystal display panel of the present invention. In the case that the anti-reflective film of the present invention is arranged on the outermost surface, the reduction in display qualities, caused by adherence of stains to the liquid crystal display panel surface, can be effectively prevented.

The present invention is also a liquid crystal display device including the liquid crystal display panel. The liquid crystal display device of the present invention further includes a backlight, a driver, and the like, in addition to the above-mentioned liquid crystal display panel. According to the liquid crystal display device of the present invention, stains such as a fingerprint which have adhered to the anti-reflective film surface can be suppressed from shining in blue, and transmitted light can be suppressed from becoming yellowish (reddish) light at the time of black display, attributed to the above-mentioned liquid crystal display panel.

EFFECT OF THE INVENTION

According to the liquid crystal display panel of the present invention, the bottom wavelength of the reflection spectrum is less than 550 nm, and therefore, a change in reflectance of light having a wavelength of blue color can be made smaller even if the reflection spectrum is changed due to adherence of stains such as a fingerprint to a surface of the anti-reflective film. In addition, according to the liquid crystal display panel of the present invention, the depolarization property of the color filter is adjusted in such a way that blue has the highest depolarization property of all the colors. Therefore, transmitted light can be prevented from becoming yellowish (reddish) light at the time of black display. As a result, light reflected on the surface to which stains have adhered and on the surface where stains have been wiped off but not completely removed can be adjusted to be an almost achromatic color, thereby suppressing coloring of the stains having adhered to the surface so that the stains are not recognized.

BEST MODES FOR CARRYING OUT THE INVENTION

The present invention is mentioned in more detail below with reference to Embodiments using drawings, but not limited to only these Embodiments.
"Embodiment 1"
FIG. 1 is a cross-sectional view schematically showing a liquid crystal display panel in accordance with Embodiment 1. As shown in FIG. 1, a liquid crystal display panel 11 in Embodiment 1 includes the first polarizer 3, the first substrate 1, a liquid crystal layer 5, the second substrate 2, and the second polarizer 4. These components are stacked in this order toward the display surface. A color filter 6 composed of R (red), G (green), and B (blue) is arranged on the liquid crystal layer 5 side of a substrate member 2a constituting the second substrate 2. An anti-reflective film 7 is arranged on the display surface side of a polarizing member 4c constituting the second polarizer 4. The first polarizer 3 and the second polarizer 4 are disposed in Cross-Nicol arrangement. The liquid crystal display panel in Embodiment 1 may include a touch panel on the display surface side of the second polarizer 4. That is, the anti-reflective film 7 may be arranged on a touch panel. In this case, this touch panel is operated by touching the anti-reflective film 7 positioned on the outermost surface by a finger and the like. Hence, stains such as a fingerprint often adhere to the surface of the anti-reflective film. In view of such a circumstance, the present invention particularly effectively suppresses a reduction in display qualities.

"Anti-Reflective Film"
An LR film can be used as the anti-reflective film 7. The LR film is composed of a single layer or two or three layers or so. The LR film shows a function of preventing reflection. The LR film normally has a luminous reflectance of about 1 to 3%. An LR film which is made of a material with a low refractive index can show a luminous reflectance of about 1%. The LR film has a simple layer structure, and therefore it can be formed by a wet coating method. Examples of typical wet coating methods include a kiss reverse method, a wire bar coating method, and a slit die coating method. FIG. 2 is a cross-sectional view schematically showing a coating method of the LR film. The kiss reverse method shown in FIG. 2(a) is a method in which a coating liquid 12 is moved from a coating liquid-filled container 14 to a groove of a gravure 13, and the coating liquid 12 charged in the groove is transferred into the polarization member 4c. The wire bar method shown in FIG. 2(b) is a method in which using a shaft 15 around which wires 16 are wound, a constant amount of the coating liquid 12 filled between the wires 16 is transferred to the polarization member 4c. The slit die method shown in FIG. 2(c) is a method in which a constant amount of the coating liquid 12 is applied to the polarization member 4c with a die 17 having a slit. According to the slit die method, a constant amount of the coating liquid 12 charged in the die 17 is pumped to the die 17. The coating liquid 12 is not exposed to air, and therefore the coating liquid 12 is not deteriorated to stably form a film.

An AR film also can be used as the anti-reflective film 7. The AR film is normally formed by a dry process. The AR film has a multilayer structure composed of about 4 to 7 layers and has a low luminous reflectance of about 0.2%. A deposition method, a sputtering method, and the like are preferably used for forming the AR film. In the deposition method, a film material is heated, dissolved, and evaporated under vacuum, thereby being deposited to an object. According to the sputtering method, a voltage of several hundreds of volts is applied between a vacuum container into which inert gas has been introduced and an electrode (target) formed of a film material. At this time, due to energy of discharge, particles of the inert gas are positively charged and these positively-charged particles are strongly attracted to and impact on a negatively charged electrode. As a result, particles ejected from a part of the film material are sputtered to form a film on an object. A DC magnetron sputtering method is mentioned as a typical sputtering method.

The productivity of the AR film is low because it is difficult to shorten the time taken to form the AR film, and therefore it is not suitably used for producing a large-sized device. However, the AR film is excellent in an effect of suppressing reflection of external light, and hence it can be preferably used, for example, in mobile devices which are used under bright external light, e.g., out of doors.

FIG. 3 is a graph showing characteristics of the anti-reflective film used in Embodiment 1. In FIG. 3, the solid line shows a spectrum before fingerprint adherence and the broken line shows a spectrum after fingerprint adherence. As shown by the single arrow in FIG. 3, the bottom wavelength of the reflection spectrum is shifted to the high wavelength region side by the fingerprint adherence. As a result, the reflectance of blue light is changed as shown in the double arrow in FIG. 3. However, according to Embodiment 1, the reflection spectrum is shifted to the high wavelength region side by the adherence of stains such as a fingerprint to the surface, the change in reflectance in the wavelength region corresponding blue is extremely smaller than that in the conventional case because the anti-reflective film whose bottom wavelength is originally on the low wavelength region side. Accordingly, according to Embodiment 1, light reflected on the surface where the stains have adhered and the surface which the stains have been wiped off but not completely removed can be adjusted to be an almost achromatic color. Therefore, the stains can be less observed to practically have no influence on the visibility, and thereby the reduction in display qualities can be suppressed.

"Polarizer and Color Filter"

Conventional polarizers were disposed in Cross-Nicol arrangement, and the first polarizer and the second polarizers in Embodiment 1 were also disposed in Cross-Nicol arrangement. Then, a transmission spectrum of light which had passed through each pair of polarizers was measured at a viewing angle of 2° with a spectroradiometer (product of TOPCON CORP.: SR-3). FIG. 4 shows each result of the transmission spectrum. FIG. 4 is a graph for comparing a spectrum of light which has passed through the conventional polarizers with a spectrum of light which has passed through the polarizers in Embodiment 1. In FIG. 4, the spectrum expressed by the solid line is a spectrum of the light which has passed through the conventional polarizers, and the spectrum of the broken line is a spectrum of the light which has passed through the polarizers in Embodiment 1. As shown in FIG. 4, according to the spectrum of light which has passed through the polarizers (product of NITTO DENKO CORP., VEG polarizer) in Embodiment 1, a difference between the maximum transmittance and the minimum transmittance in a wavelength of 400 to 650 nm is 0.03% or less, that is, the spectrum is flat in the visible light region. In contrast, the spectrum of light which has passed through the conventional polarizers (product of NITTO DENKO CORP., SEG1224 polarizer) is shown by a U-shape. The difference between the maximum transmittance and the minimum transmittance in a wavelength of 400 to 650 nm is 0.03% or more. A polarization performance (dichromatism) of the polarizer generally depends on an alignment accuracy of an iodine complex. A PVA (polyvinyl alcohol) film to which an iodine complex has adsorbed is stretched, thereby aligning the iodine complex into a specific direction. The alignment accuracy of the polarizer which is used in Embodiment 1 is increased by optimizing this absorption conditions and the film stretching.

FIG. 5 is a perspective view showing arrangement of the color filter and the polarizers in Embodiment 1. FIG. 5(a) shows an embodiment in which a polarization axis of the first polarizer and a polarization axis of the second polarizer are perpendicular to each other. FIG. 5(b) shows an embodiment in which a polarization axis of the first polarizer and a polarization axis of the second polarizer are parallel to each other. As shown in FIG. 5(a), a polarization axis 9a of the first polarizer 3a is perpendicular to a polarization axis 10a of the second polarizer 4a, and a color filter 6a which scatters transmitted light 8a is arranged between these polarizers 3a and 4a (Embodiment A). According to the color filter, the contrast ratio varies depending on light scattering. That is, the color filter has a so-called depolarization property. According to Embodiment 1, the anti-reflective film whose reflection spectrum has a bottom wavelength of less than 550 nm is used, and therefore, yellowish (reddish) light tends to be displayed at the time of black display. Therefore, the depolarization property of this color filter 6a is adjusted in order to suppress the coloring. Specifically, the color filter 6a is formed to have a thickness of 1.69 μm in the respective colored parts using a red pigment (the depolarization property is adjusted by controlling a particle size of a combination of an azo, quinacridone, anthraquidone anthraquinone, perylene, perynone pigment, and the like), a green pigment (the depolarization property is adjusted by controlling a particle size of a combination of a phthalocyanin green and a yellow pigment), and a blue pigment (the depolarization property is adjusted by controlling a particle size of a combination of a phthalocyanin blue pigment and a violet pigment). The depolarization property of the color filter can be adjusted by lowering the depolarization property by decreasing the particle size of the pigment particle of the color filter. A panel shown in FIG. 5(b) was prepared and measured for contrast ratio. According to the panel, a polarization axis 9b of the first polarizer 3b is parallel to a polarization axis 10b of the second polarizer 4b, and a color filter 6b is arranged between these polarizers 3b and 4b (Embodiment B). Then, an intensity of a transmitted light 8a which has passed through the color filter and the polarizers in accordance with Embodiment A and an intensity of a transmitted light 8b which has passed through the color filter and the polarizers in accordance with Embodiment B were measured. A contrast ratio was evaluated on the bases of the intensities. The contrast ratio can be determined by calculating a value $I_2/I_1$, where the intensity of the transmitted light in Embodiment A is defined as $I_1$ (black display) and the intensity of the transmitted light in Embodiment B is defined as $I_2$ (white display). The following Table 1 shows the contrast ratio of each color in the conventional color filter and the contrast ratio of each color in the color filter in Embodiment 1.

TABLE 1

|  | Contrast ratio | | |
| --- | --- | --- | --- |
|  | Blue | Green | Red |
| Conventional color filter | 10300 | 10700 | 5750 |
| Color filter in Embodiment 1 | 11900 | 12800 | 17100 |

FIG. 6 is a graph showing the results shown in Table 1. Thus, according to Embodiment 1, the contrast ratio of light which has passed through the liquid crystal display panel is high in order of red>green>blue. That is, a leakage light amount at the time of black display is large in order of blue>green>red (Embodiment A). Therefore, if the bottom wavelength of the reflection spectrum is less than 550 nm, a yellowish (reddish) light can be displayed as an almost achromatic color.

FIG. 7 is a graph for comparing a transmission spectrum of light which has passed through the panel including the conventional polarizers and color filter at the time of black display with a transmission spectrum of light which has passed through the panel including the polarizers and the color filter in Embodiment 1 at the time of black display. As shown in FIG. 7, if the panel includes the color filter and the polarizers, each in accordance with Embodiment 1, the contrast ratio is high in order of red>green>blue, as shown in Table 1, and further, a transmission spectrum at the time of black display has changed toward a flat profile in the entire visible light region in comparison to the case where the conventional color filter and the conventional polarizers are used in combination. The panel in Embodiment 1 has excellent display performances.

"Embodiment 2"

The liquid crystal display panel in accordance with Embodiment 2 has the same configuration as in Embodiment 1, except that an LR film which had been provided with an AG treatment was used as an anti-reflective film (hereinafter, also referred to as an AGLR film). The AG-treated film has irregularities on its surface and prevents glare of light by scattering external light. The AG treatment can reduce specular reflection of external light, but if the light is scattered too much by the irregularities on the surface, white turbidity (blur) is observed. In contrast, according to the AGLR film, the characteristics attributed to the AG treatment and the characteristics of the LR film can be exhibited together. As a result, the white turbidity (blur) due to the AG treatment is suppressed and simultaneously reflection of external light due to the LR film can be sufficiently suppressed. In addition, the AGLR film makes it possible to provide an anti-reflective film more reasonable than the AR film.

The present invention can exhibit a great effect also for the AGLR film. This is because the AGLR film surface has irregularities and a fingerprint which has adhered to these irregularities tends to remain because it is harder to wipe off.

"Evaluation Test"

AGLR films having the same configuration as that of the anti-reflective film in accordance with Embodiment 2 were prepared to be used as evaluation samples. These evaluation samples were different in thickness, and therefore, their reflection spectra had different bottom wavelengths. The bottom wavelengths of the reflection spectra of the evaluation samples were 450 nm, 480 nm, 500 nm, 510 nm, 520 nm, 530 nm, 540 nm, 550 nm, 560 nm, 580 nm, 600 nm, and 630 nm. With regard to the evaluation samples, the Haze value was 24% and the refractive index of the anti-reflective film was 1.3.

(1) Fingerprint Visibility

Polarizers were attached to both surfaces of a liquid crystal panel in Cross-Nicol arrangement. A fingerprint was put on the polarizer surface on a display surface side. Then, the fingerprint was wiped off five or six times with a wiping cloth (product of Kanebo Synthetic Fibers, Ltd., trade name: Savina). Then, light at 300 to 2200 lux (fluorescent light or outdoor light) was radiated to the liquid crystal panel under the following conditions: black is displayed on the liquid crystal panel; no voltage is applied to the liquid crystal (OFF state); and backlight is off. In such a manner, existence of the fingerprint which had been wiped off (a residue of sebum and sweat) was visually observed and evaluated based on the following criterion.

Excellent: No fingerprint is observed.
Good: Fingerprint is slightly observed by careful observation, but it has no problem in practical use.
Average: Fingerprint is slightly observed.
Bad: Fingerprint is clearly observed.

In order to uniform the thickness of the fingerprint, the fingerprint was wiped off, and after that, the evaluation was performed. In addition, the fingerprint which still remains even after being wiped off with a cloth is the biggest problem in practical use. If the evaluation is performed without wiping off the fingerprint, uneven fingerprint tends to be recognized, and a variation in visibility will be large. This might be because the thickness of the fingerprint is large and varies.

(2) Reflection of External Light

Reflection of external light on the display surface was evaluated. Light at 300 to 2200 lux (fluorescent light or outdoor light) was radiated to the liquid crystal panel. In such a manner, the level of the reflection was evaluated by eye observation, based on the following criterion.

Excellent: Reflection of external light is not recognized at all.
Good: Reflection of external light is recognized by careful observation, but it has no problem in practical use.
Average: Reflection of external light is slightly recognized.
Bad: Reflection of external light is recognized.

(3) Luminous reflectance

The evaluation sample was attached to a glass substrate whose back surface was provided with a black tape. This prepared glass substrate was subjected to reflection spectrum measurement (spectrophotometer: product of Hitachi High-Technologies Corporation, trade name: U-4100, light source: ultraviolet area=heavy hydrogen lamp, visible/infrared region=50 W halogen lamp, integrating sphere: Φ60 mm, the inner surface was coated with $BaSO_4$, incident angle: 10°, wavelength: 380 nm to 780 nm). The visual efficacy was corrected in accordance with the XYZ colorimetric system which is measured at a viewing angle of 2° using the C light source (color temperature: 2740 K) according to JIS Z 8701 to give a luminous reflectance (Y value).

The following Table 2 shows evaluation results of (1) fingerprint visibility, (2) reflection of external light, and (3) luminous reflectance.

TABLE 2

| Bottom wavelength[nm] | Fingerprint visibility | Reflection of external light | Luminous reflectance [%] |
| --- | --- | --- | --- |
| 450 | Good | Bad | 1.72 |
| 480 | Good | Average | 1.66 |
| 500 | Excellent | Good | 1.65 |
| 510 | Excellent | Excellent | 1.64 |
| 520 | Excellent | Excellent | 1.63 |
| 530 | Excellent | Excellent | 1.62 |
| 540 | Good | Excellent | 1.61 |
| 550 | Average | Excellent | 1.61 |
| 560 | Average | Excellent | 1.61 |
| 580 | Bad | Excellent | 1.61 |
| 600 | Bad | Excellent | 1.64 |
| 630 | Bad | Bad | 1.69 |

As shown in the above Table 2, the fingerprint shined in blue when the bottom wavelength of the reflection spectrum was 550 nm or more. However, if the bottom wavelength is less than 550 nm, the fingerprint had no problem in practical use. This must be because the bottom wavelength was previously set to be less than 550 nm, and thereby the change in reflectance of blue became smaller even if, due to optical synthesis of the fingerprint layer and the anti-reflective film, the bottom wavelength was shifted to the longer wavelength region. In addition, the fingerprint on the film whose reflection spectrum had a bottom wavelength of less than 540 nm was not recognized. This must be because the change in reflectance of blue became smaller. The fingerprint on the film whose reflection spectrum had a bottom wavelength of less than 500 nm was hardly observed although the luminous reflectance was high. This must be because the fingerprint was observed due to not an absolute value of the luminous reflectance but a difference in reflectance between a part where the fingerprint has adhered and a part where no fingerprint has adhered. In addition, with regard to the film whose reflection spectrum had a bottom wavelength of 500 nm to 530 nm, the luminous reflectance increased, but the reflection of external light caused no problem. This might be because a few hundredth of a percent increase in luminous reflectance is a so small change that human eyes can not recognize it, and therefore, such an increase has no influences on the reflection of external light.

In this test, the fingerprint was used as an evaluation object, but the same effects are expected in principle for different stains which have remained on the surface of the anti-reflective film after being wiped off.

In addition, the AGLR film was used as the anti-reflective film in this test. The results of this evaluation test are also applied to the LR film or the AR film which is used in Embodiment 1.

The present application claims priority under the Paris Convention and the domestic law in the country to be entered into national phase on Patent Application No. 2006-265093 filed in Japan on Sep. 28, 2006, the entire contents of which are hereby incorporated by reference.

BRIEF DESCRIPTION OF DRAWINGS

FIG. 2(a) shows a kiss reverse method. FIG. 2(b) shows a wire bar method. FIG. 2(C) shows a slit die method.

FIG. 5(a) shows an embodiment in which a polarization axis of the first polarizer is perpendicular to a polarization axis of the second polarizer. FIG. 5(b) shows an embodiment in which a polarization axis of the first polarizer is parallel to a polarization axis of the second polarizer.

EXPLANATION OF NUMERALS AND SYMBOLS

Figure 1:
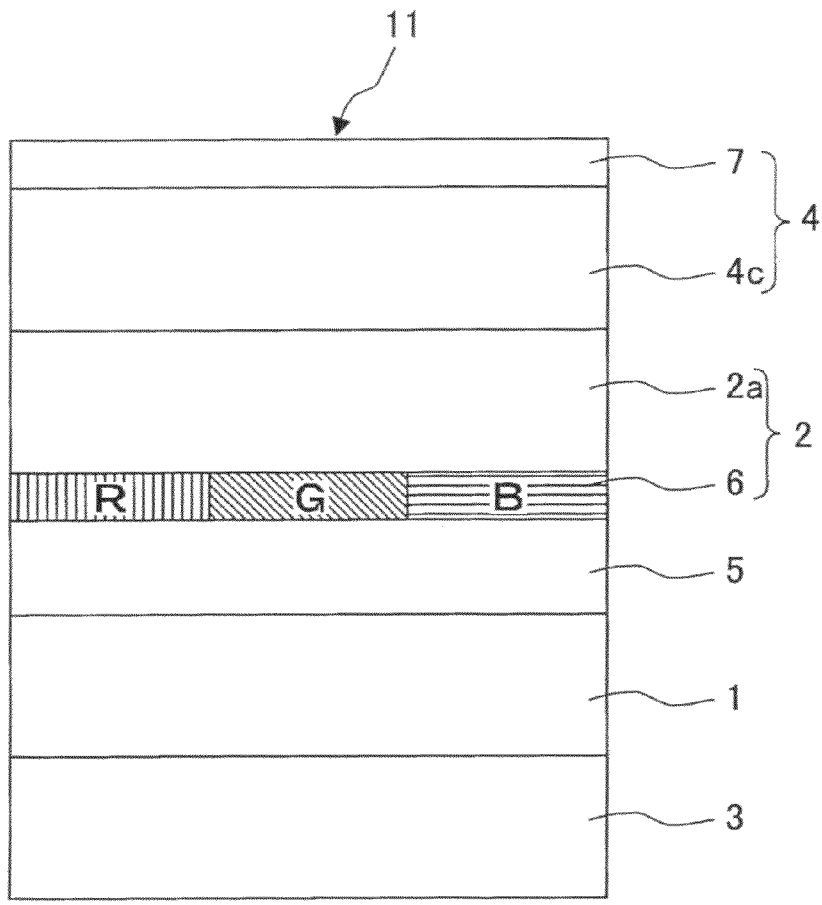
FIG. 1 is a cross-sectional view schematically showing the liquid crystal display panel in accordance with Embodiment 1.
Figure 2:
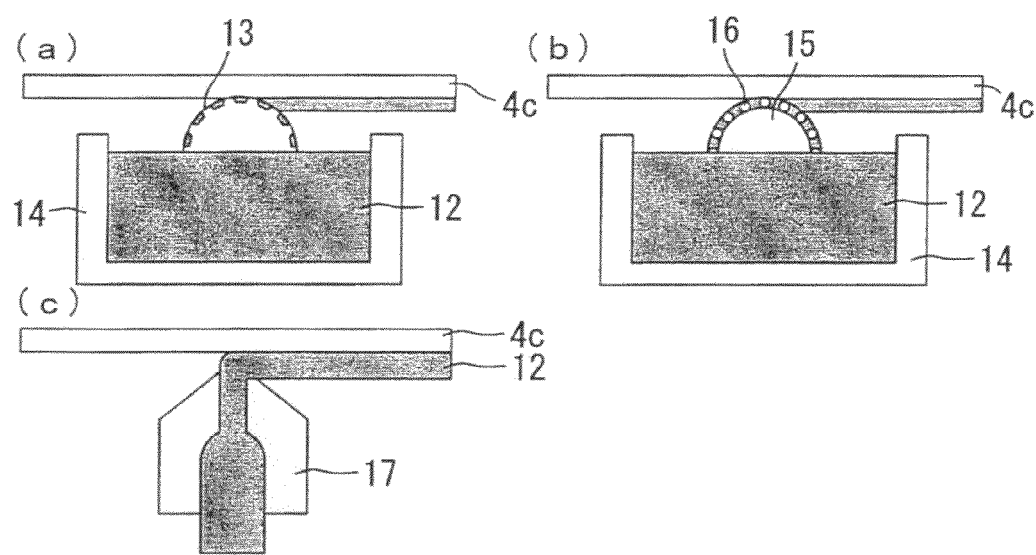
FIG. 2 is a cross-sectional view for explaining a coating method of an LR film.
Figure 3:
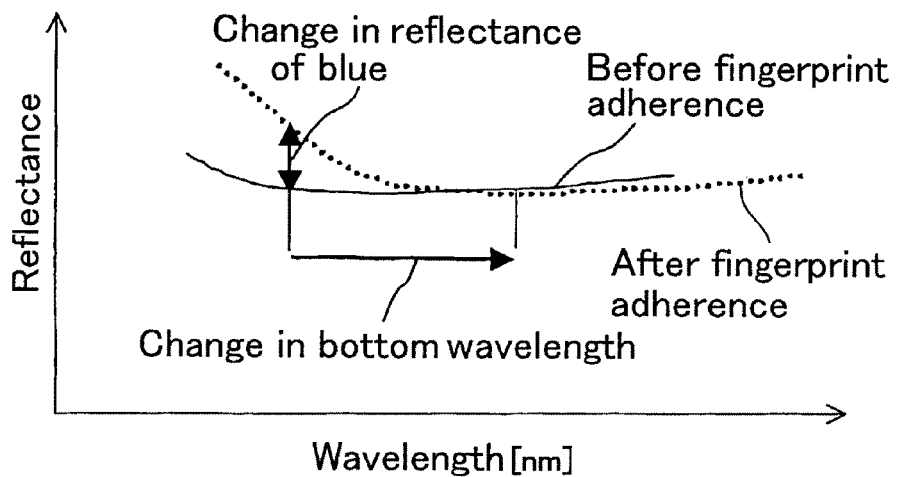
FIG. 3 is a graph showing characteristics of the anti-reflective film in accordance with Embodiment 1.
Figure 4:
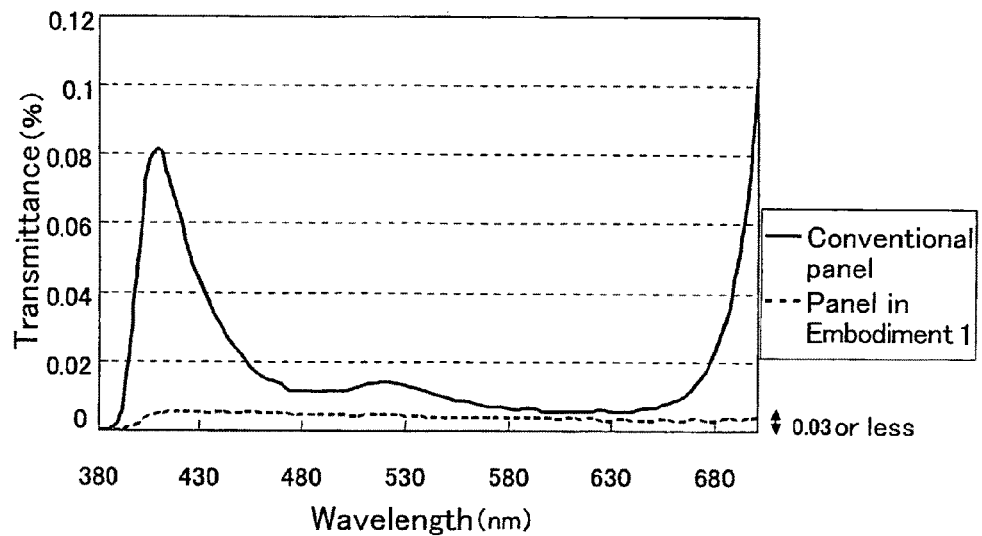
FIG. 4 is a graph for comparing a spectrum of light which has passed through the conventional polarizers with a spectrum of light which has passed through the polarizers in Embodiment 1
Figure 5:
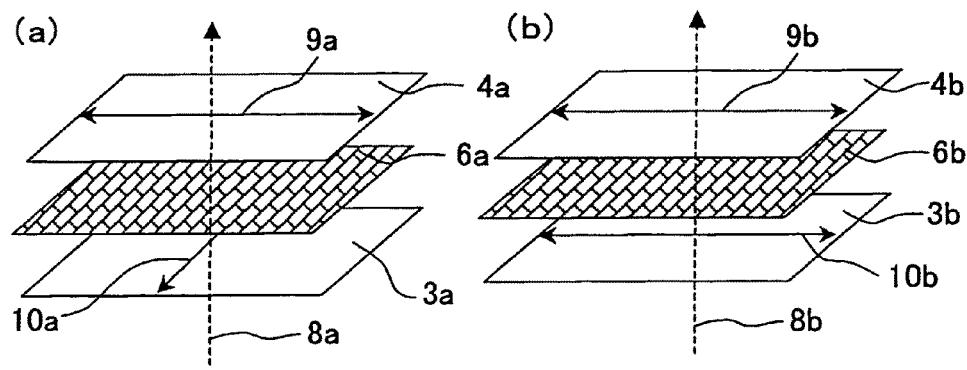
FIG. 5 is a perspective view showing arrangement of the color filter and the polarizers in accordance with Embodiment 1.
Figure 6:
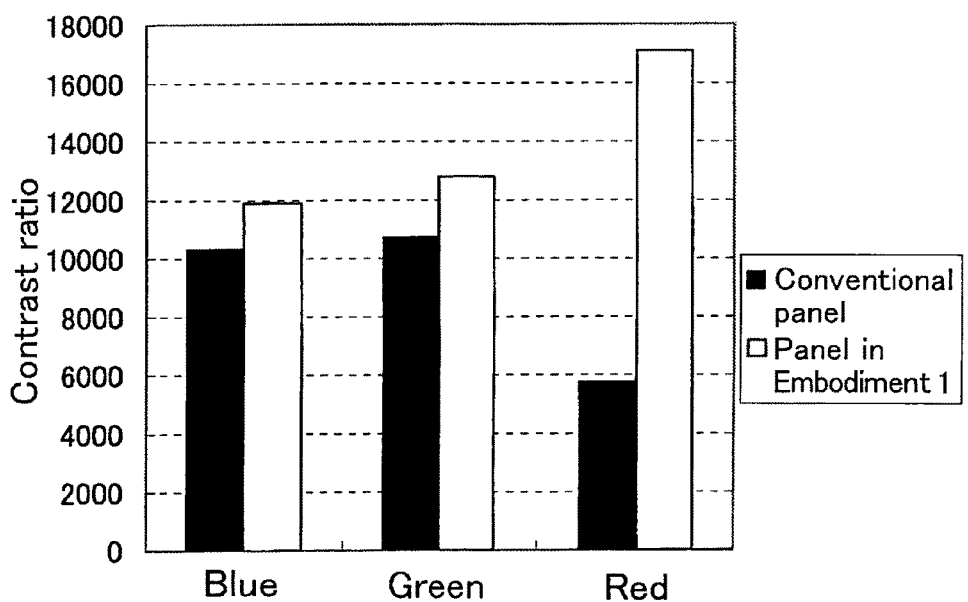
FIG. 6 is a graph for comparing a contrast ratio of each color in the conventional color filter with a contrast ratio of each color in the color filter in Embodiment 1.
Figure 7:
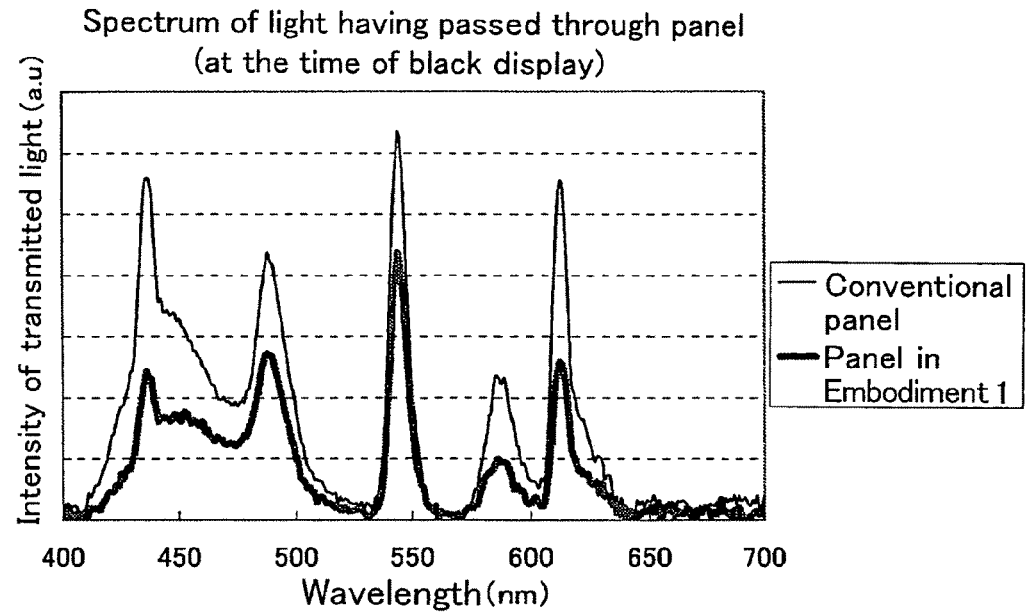
FIG. 7 is a graph for comparing a spectrum of light which has passed through the panel including the conventional polarizers and the conventional color filter at the time of black display with a spectrum of light which has passed through the panel including the polarizers and the color filter each in Embodiment 1 at the time of black display.
Figure 8:
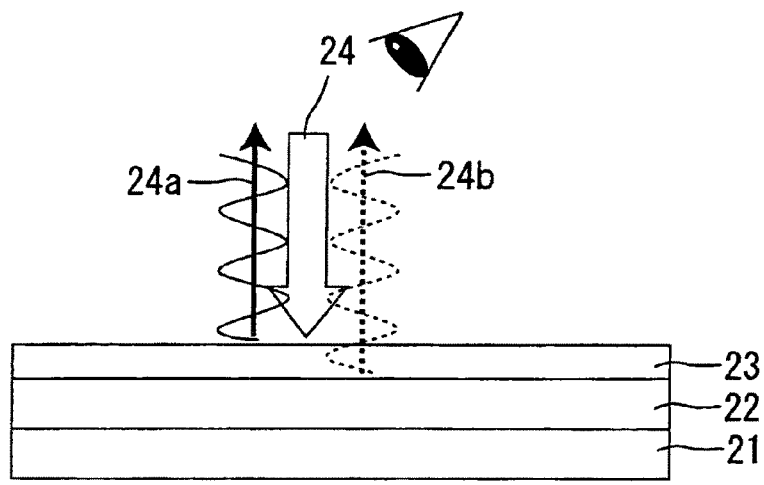
FIG. 8 is a cross-sectional view schematically showing an arrangement configuration of the anti-reflective film which reduces a reflectance by light interference.
Figure 9:
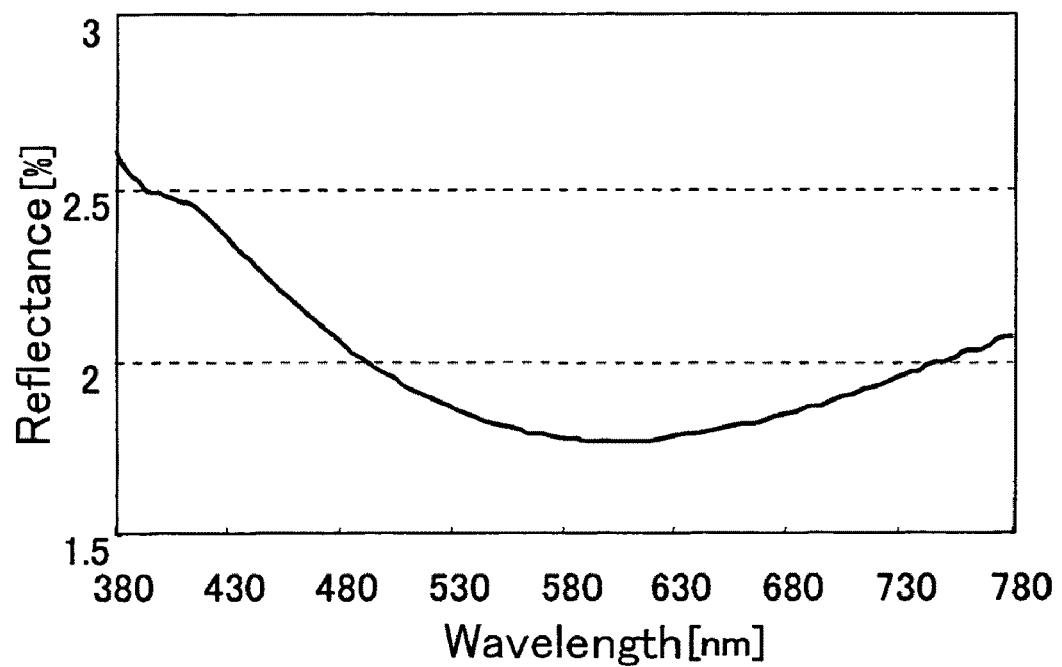
FIG. 9 is a graph showing a common reflection spectrum of an anti-reflective film.

1: First Substrate
2: Second Substrate
2a: Substrate member
3, 3a, 3b: The first polarizer
4, 4a, 4b: The second polarizer
4c: Polarizing member
5: Liquid crystal layer
6, 6a, 6b: Color filter
7, 23: Anti-reflective film
8a, 8b: Transmitted light
9a, 9b: Polarization axis of the first polarizer
10a, 10b: Polarization axis of the second polarizer
11: Liquid crystal display panel
12: Coating liquid
13: Gravure
14: Coating liquid-filled container
15: Shaft
16: Wire
17: Die
21: Display
22: Substrate
24: Incident light
24a: Reflected light (reflection on the outermost surface of the anti-reflective film)
24b: Reflected light (reflection on the boundary surface between the anti-reflective film and the substrate)

The invention claimed is:

1. A liquid crystal display panel having a structure in which a first polarizer, a first substrate, a liquid crystal layer, a second substrate, and a second polarizer are stacked in this order toward a display surface,
   wherein the second polarizer includes an anti-reflective film on a display surface side, a reflection spectrum of the anti-reflective film having a bottom wavelength of less than 550 nm,
   at least one of the first and second substrates includes a color filter including three colors of blue, green, and red, and
   in the color filter, blue has the highest depolarization property of all the three colors.

2. The liquid crystal display panel according to claim 1, wherein in the color filter, blue, green, and red are ranked in descending order of depolarization property.

3. The liquid crystal display panel according to claim 1, wherein the first polarizer and the second polarizer are disposed in Cross-Nicol arrangement, and
a transmission spectrum of the first and second polarizers is flat in a visible light region.

4. The liquid crystal display panel according to claim 1, wherein a reflection spectrum of the anti-reflective film has a bottom wavelength of more than 500 nm.

5. The liquid crystal display panel according to claim 1, wherein a surface of the anti-reflective film is provided with a light scattering anti-glare treatment.

6. The liquid crystal display panel according to claim 1, wherein the anti-reflective film is arranged on an outermost surface of the liquid crystal display panel.

7. A liquid crystal display device comprising the liquid crystal display panel of claim 1.

* * * * *